UNITED STATES PATENT OFFICE.

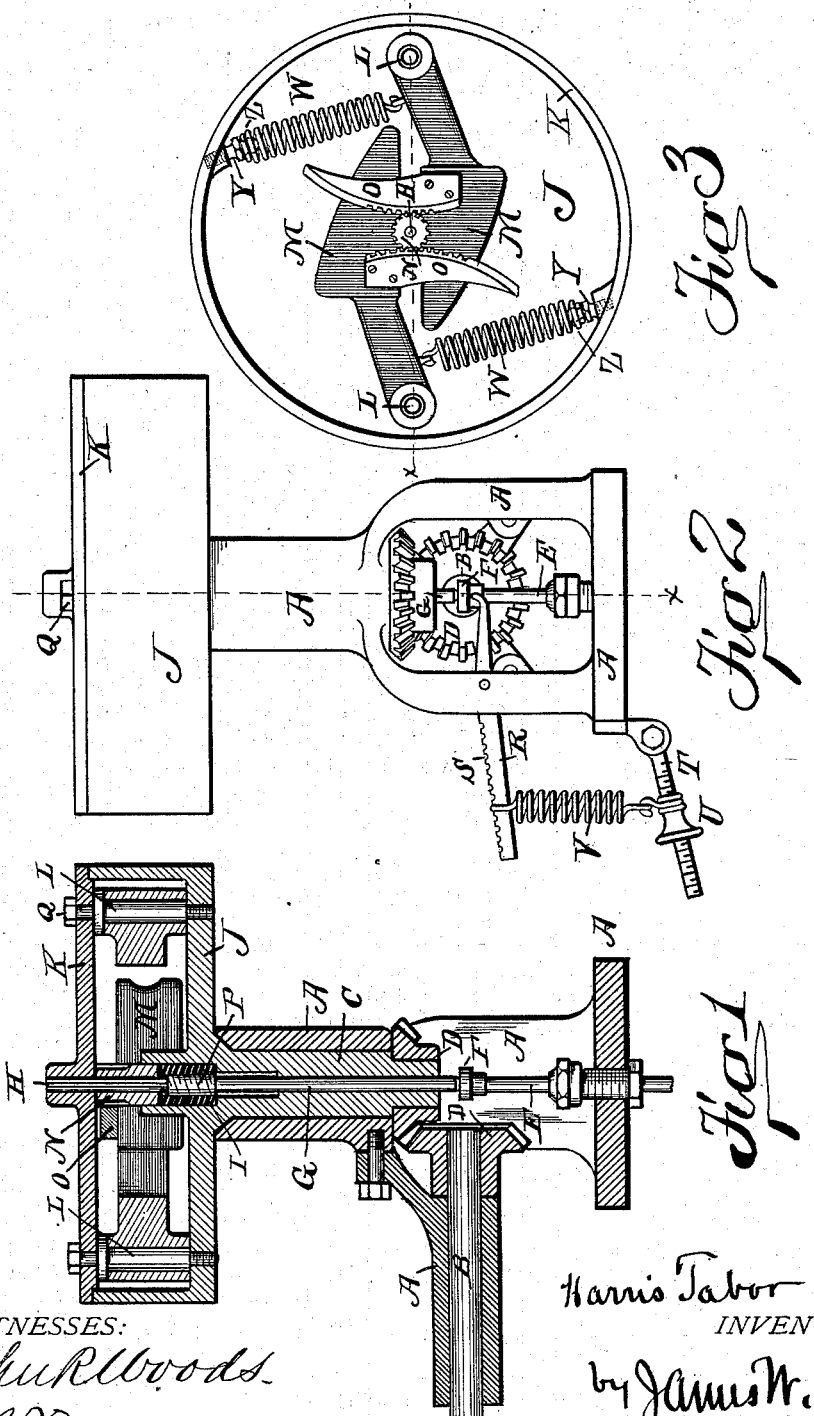

HARRIS TABOR, OF ALLEGHENY, PENNSYLVANIA.

GOVERNOR.

SPECIFICATION forming part of Letters Patent No. 276,304, dated April 24, 1883.

Application filed January 15, 1883. (No model.)

*To all whom it may concern:*

Be it known that I, HARRIS TABOR, of Allegheny, Allegheny county, Pennsylvania, have invented certain new and useful Improvements in Governors, of which the following is a specification.

This invention pertains to governors for regulating the velocity of motion in mechanism. It relates to the arrangement of the centrifugal and centripetal devices with reference to each other and with reference to the adjusting devices; and it consists in the novel features specifically pointed out in the claims.

In the accompanying drawings, Figure 1 is a vertical section on line $x$ of a steam-engine governor embodying my improvements. Fig. 2 is an elevation of the same, and Fig. 3 a plan.

A represents a housing or standard; B, the receiving-shaft; C, the journal of the weight-carrying part of the governor; D D, a pair of bevel-gears for transmitting motion from shaft B to journal C; E, a rod adapted to connect with a steam-valve or other device for altering motion in the device to be regulated; F, a conical socket at upper end of stem E; G, a rod resting in socket F, and passing up through and out of journal C, being free to rotate in said journal; H, the upper end of rod G, provided with a spline; I, a nut fixed in the upper end of journal C; P, a threaded portion of rod G, engaging nut I; N, a pinion fitted to splined part of rod G; J, a disk formed at and with the upper end of journal C, and having a rim to form a pan-like case; K, a lid to said case; L L, two pivot-studs fixed in upper face of disk J; M M, the governor-weights, provided with arms and pivoted on studs L; O O, toothed segments attached to weights M M, and engaging with pinion N; Q, upward prolongations of studs L, provided with nuts, and arranged to clamp lid K in place; R, a lever pivoted to standard A, and engaging by its inner end with stem E; S, a series of notches in outer arm of lever R; T, a threaded rod attached to the standard, and projecting outward like outer arm of lever R; U, a nut on rod T; V, a spring, engaging a notch S and nut U; W W, springs attached to weights M and rim of disk J; Y, spherical-headed screws engaging in rim where springs W attach, and Z contractions of diameter of springs W at their ends around the spherical heads of screws Y.

Assume that in the case of a steam-engine the downward motion of stem E will contract a valve-opening, and thus cause a lessening of the engine speed, and that an upward motion of the stem will produce an opposite effect. If the revolving disk receive an increased speed, centrifugal force will move weights outward, the pinion will be revolved, the rod G will be revolved and screwed downward, the stem E will move downward, and the engine speed will be lessened. A lessening of the engine speed will have an opposite effect. The rod G revolves with the upper work, and its thrust-bearing is in the socket F in plain view and accessible for oiling. In connection with the lifting action of lever R upon the socket, all lost motion is suppressed.

The disk-case J serves to inclose the upper works and renders the exterior simple and tidy.

The pinion N is splined upon rod G to permit the proper rise and fall of that rod; but the pinion may of course be solid upon the rod, if made of sufficient length to always maintain proper engagement with the segments and provided with sufficient end room to move properly endwise.

The top studs, Q, serve to attach the lid and at the same time, by the lid, to steady and support the upper ends of the pivots L.

The lever R, in connection with spring V, is to act as a speed-adjuster, as hereinafter specified. Notches S are to retain upper end of speeder-spring V in desired position on lever R. Nut U is to adjust the position of the lower end of speeder-spring on rod T. Lever R and rod T are set divergent, as shown. If spring be moved outward, its effect upon rod E will be greater, owing to increased leverage, and the tension of the spring will at the same time be increased, owing to the divergence of levers R and rod T.

Springs W, as the weights oscillate, have an oscillatory motion with their attachment to the rim as a pivot-point. The spherical ends of screws Y furnish a pivot-bearing on which the contracted portion Z of the springs may thus rock, and this spherical form also permits screws Y to be turned for adjustment while the springs remain stationary.

A novel and important principle of construction will now be explained in connection with the device, as described. Let it be understood that springs W furnish centripetal power, that the power of the springs is of course adjustable by screws Y, that these screws cannot be manipulated while the governor is in motion, that spring V also furnishes centeriptal power, and that this latter spring, being external and practically stationary, can be manipulated while the governor is in motion. Centripital power can thus in this device be altered while governor is running, and the speed of the mechanism to be regulated thus altered, so far as simple adjustment of centripetal power of the governor will effect such alteration. Assume the weights to be brought inward till their centers of gravity lie on line $x$ of Fig. 3. Centrifugal force will then of course be zero. When centrifugal force is zero let springs have zero tension. The forces will then be balanced, and will remain balanced in any new position of the weights. When weights occupy a more outward position velocity will be greater and their centrifugal force will be greater; but the centripetal power of the springs will also have increased in corresponding degree, with a constant speed the weights will, with the forces thus harmonized, remain in any position where put. The device is thus seen to be not at all analogous to governors involving the properties of the conical pendulum. As thus adjusted the device is incapable of effecting any regulating function. If the speed of the governor, before spoken of as being constant, be increased, the power of the weights will increase, while the power of the springs remains unchanged. The springs, having been adjusted for a certain speed, produce a balance of forces at that speed only. To form a regulator it is requisite that the springs should be adjusted to harmonize with the centrifugal force at the speed of rotation which it is desired to maintain. It will be noticed that springs W are hooked to the weight-arms at a certain point in their length. Assuming their tension to be zero when weights are in their zero position, it follows that if the tension of springs be increased their power may be increased, but their zero has been destroyed, and harmony cannot exist. If, instead of increasing their tension, they be hooked to a new point nearer the weights their centripetal effect may be increased without departing from a balancing of forces at zero. The speeder-spring V is arranged to have this effect. With weights at their zero position, let lever R take its own position. Adjust bar T parallel with the lever. Connect spring V with zero tension. It follows that spring V has zero tension when placed in any notch, because the lever and bar are parallel and the length of spring thus unchanged; but the effect of the spring is greatly increased when moved to outer notches, because the lever in a new position will diverge from bar T—the spring acts on a longer lever. The parts are to be arranged in accordance with these principles, so that the centripetal force may be increased where increased speed is desired without destroying the balance of forces, whereby an isochronous regulator is produced.

I do not confine myself to the specific devices set forth. I explain the principle and the best manner in which I contemplate applying that principle.

I claim as my invention—

1. With a centrifugal governor, the combination of a speeder-spring arranged to resist the centrifugal action and adjusted to have its zero-point of resisting force correspond with the zero-point of centrifugal force in the centrifugal elements of the governor, as set forth, and means, substantially as set forth, for adjusting the working effect of said spring without altering its initial tension, substantially as and for the purpose specified.

2. With a centrifugal governor, the combination of a speeder-spring, adjusted as set forth, a lever adapted to have such spring attach at various points in its length, and a bar fitted to have the other end of said spring attach to it at various points in its length, arranged parallel with the plane which would be occupied by said lever when the governor-weights were in a zero position, substantially as and for the purpose specified.

3. The combination of a centrifugal governor, a speeder-lever having spring-retaining notches, as set forth, and a speeder-spring engaging said lever and adjusted to have its zero correspond with the zero of centrifugal force of the governor, as set forth, substantially as and for the purpose specified.

4. The combination, with a centrifugal governor, a variable speeder-lever, and a speeder-spring, of pivoted bar T, arranged to connect at different points in its length with said spring, substantially as and for the purpose specified.

5. The combination, with a centrifugal governor, a variable speeder-lever, and a speeder-spring, of the threaded bar T and nut U, substantially as and for the purpose specified.

6. The combination of a centrifugal governor, a speeder-spring adjusted and arranged as set forth, to resist the centrifugal action of the governor-weights through the medium of a speeder-lever, and a speeder-lever constructed and arranged to have said spring attach at various points in its length, substantially as and for the purpose specified.

7. In a centrifugal governor, the combination of a housing-standard and a vertical hollow journal carrying at its top a disk with a rim, substantially as and for the purpose specified.

8. In a centrifugal governor, the combination of a housing-standard, a vertical hollow journal carrying at its top a disk with a rim, weights pivoted within said rim, a cover fitting said rim, pivot-studs for said weights fixed in said disk, and projections Q, formed on said pivot-studs and provided with nuts, substantially as and for the purpose specified.

9. In a centrifugal governor, the combination of a revolving weight-carrier, pivoted weights provided with toothed segments, a reciprocating and rotating rod screwed in the axis of the weight-carrier, and a central pinion fixed against rotation on said rod, substantially as and for the purpose specified.

HARRIS TABOR.

Witnesses:
B. H. CULBERTSON,
W. H. STERRITT.